May 27, 1941.　　　E. W. CARROLL　　　2,243,246
PITTING MACHINE
Filed Oct. 19, 1938　　　6 Sheets-Sheet 1

INVENTOR.
ELLSWORTH W. CARROLL.
BY
*Lippincott + Metcalf*
ATTORNEYS.

May 27, 1941. E. W. CARROLL 2,243,246
PITTING MACHINE
Filed Oct. 19, 1938 6 Sheets-Sheet 2

Fig. 2.

INVENTOR,
ELLSWORTH W. CARROLL.
BY
Lippincott + Metcalf
ATTORNEYS.

May 27, 1941.  E. W. CARROLL  2,243,246
PITTING MACHINE
Filed Oct. 19, 1938   6 Sheets-Sheet 3

INVENTOR,
ELLSWORTH W. CARROLL.
BY
Lippincott + Metcalf
ATTORNEYS.

May 27, 1941.  E. W. CARROLL  2,243,246
PITTING MACHINE
Filed Oct. 19, 1938   6 Sheets-Sheet 5

INVENTOR,
ELLSWORTH W. CARROLL.
BY
Lippincott + Metcalf
ATTORNEYS.

May 27, 1941.  E. W. CARROLL  2,243,246
PITTING MACHINE
Filed Oct. 19, 1938  6 Sheets-Sheet 6

INVENTOR,
ELLSWORTH W. CARROLL.
BY
Lippincott & Metcalf
ATTORNEYS.

Patented May 27, 1941

2,243,246

UNITED STATES PATENT OFFICE 2,243,246

PITTING MACHINE

Ellsworth W. Carroll, San Francisco, Calif., assignor to S & W Fine Foods, Inc., San Francisco, Calif., a corporation of California Application October 19, 1938, Serial No. 235,810

21 Claims. (Cl. 146—19)

My invention relates to machines for the pitting of fruit, more particularly to inspection and sorting mechanism for such machines.

The invention although of general application relates in the present disclosure to a pitting machine for cherries wherein the fruit to be pitted is dumped into a hopper from which it is conveyed individually to pitting mechanism to be operated upon to remove the pit therefrom.

The pitting mechanism of the machine in connection with which my invention is to be described, comprises a battery of simultaneously reciprocating pitting tools having a generally vertical reciprocatory movement and a simultaneous oscillatory movement substantially normal thereto. The oscillatory component of movement of the pitting tools includes a movement in the direction of travel of the conveyor mechanism, such movement occurring during the cooperation of the tools and conveyor during pitting, thus enabling continuous, uninterrupted travel of the conveyor which carries the fruit from the hopper to pitting position below the pitting tools.

Each pitting tool reciprocates through a stripper plate which is always maintained in alinement with such tool, and upon withdrawal of the pitting tool to its initial starting position following a pitting stroke, the pitted fruit is stripped therefrom by the stripper plate and permitted to roll from the end of the conveyor mechanism under guidance of a baffle into a suitable receptacle.

By reason of the fact that all fruit of a certain kind, such as cherries, for example, invariably are non-uniform as to size and shape, and the pits therein may not be located centrally thereof, it occasionally happens that a pitting tool will not engage a pit symmetrically and may either chip the pit or may fail entirely to eject the pit from the fruit. In the machine such as briefly described above, such fruit, nevertheless is discharged into the same receptacle which receives the successfully pitted fruit.

It is accordingly an object of the present invention to improve upon a machine of the above type in such a manner as to segregate unpitted fruit from the pitted product of the machine.

A further object of the invention is to provide a machine which shall with great certainty provide a pitted product entirely free of unpitted fruit.

Another object of the invention is to provide an improved machine wherein the unsuccessfully pitted fruit will be segregated from the successfully pitted fruit in response to the results encountered in the pitting of such fruit.

Another object of the invention is to provide an improved pitting machine which shall not only segregate unsuccessfully pitted fruit from the pitted fruit, but shall also dispose of the pits extracted from the fruit, in such manner as to preclude the possibility of such pits from being discarded into the receptacle for catching the pitted fruit.

Additional objects of the above invention will be brought out in the following description of the same taken in conjunction with the accompanying drawings wherein.

The above figures of the drawings are substantially to scale.

In general the invention involves the provision of a pair of alternative discharge routes for the product of the machine, and means responsive to the success or failure of a pitting operation, for determining which of the alternative discharge routes shall be open to the fruit operated upon by the pitting mechanism at the time.

More specifically, the discharge routes are controlled by a trap door which, during successful pitting operations, is maintained in a position, exposing one of the alternative routes to the pitted product of the machine. Thus all of the successfully pitted fruit will follow this route. Upon failure of a pitting operation to eject a pit from a fruit, the trap door is caused to fly open, blocking the normally open discharge route, and exposing the alternative discharge route to the passage of such fruit as has not been pitted, and thus guiding the same to a separate receptacle provided for the purpose. The mechanism for accomplishing such separation of the pitted from the unpitted fruit is rather complex and a detailed description of the same follows, reference being made to the drawings for a clear understanding of the same.

The drawings take in only that portion of the machine involving the pitting mechanism and the improvements applied in connection therewith, constituting the subject matter of the present invention.

Inasmuch as the end of the machine at which the hopper is located in no way pertinent to the present invention, no attempt has been made to either disclose or describe that portion of the machine.

Figure 1:
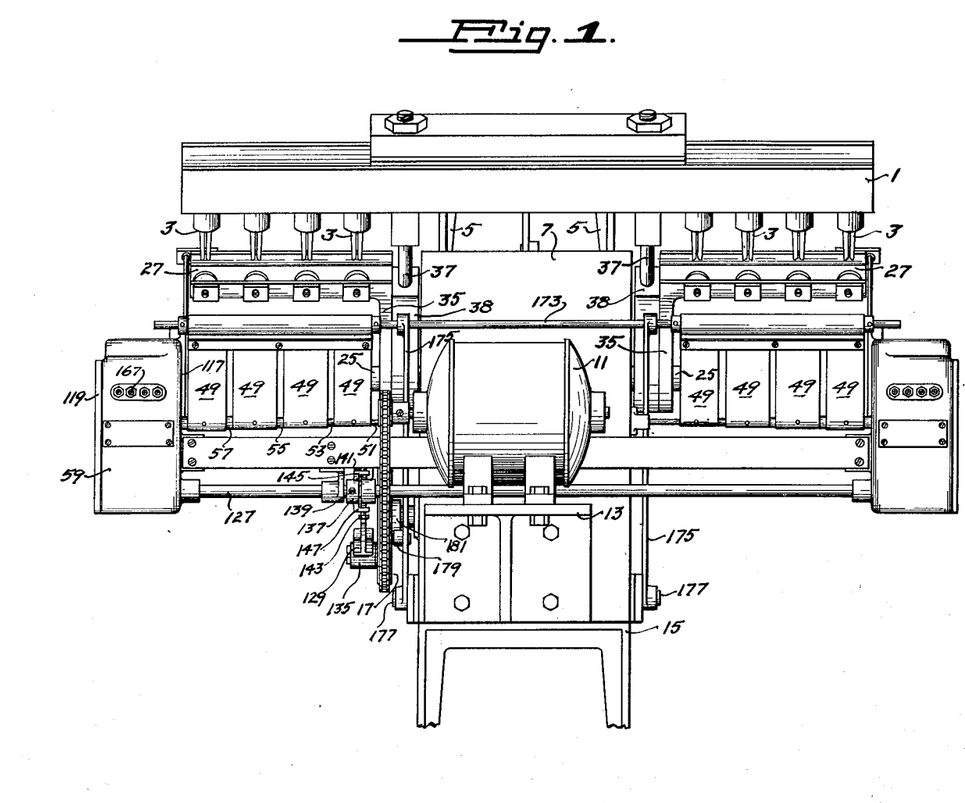
Fig. 1 is a front end view of a machine embodying my invention.

In Fig. 1, I have disclosed the front end of the machine at which the fruit is pitted and discharged into receptacles (not shown) placed below the machine, and in a position to catch the fruit as it is discharged.

The pitting mechanism comprises a crosshead 1, extending transversely of the machine and supporting a number of depending pitting tools 3 at either end thereof, the crosshead being mounted on a pair of reciprocating uprights 5 extending from a housing 7 located on the longitudinal axis of the machine, thus enabling the pitting tools 3 to be reciprocated in unison by reciprocating mechanism located in the housing.

Such mechanism has not been disclosed in that its construction is not pertinent or necessary to a complete and clear understanding of the present invention, but forms the subject matter of Patent No. 2,092,956 dated September 14, 1937, for a "Fruit pitter" in which I appear as one of joint inventors. The mechanism is of such character as to impart to the pitting tools the reciprocating motion previously described, and the simultaneous oscillatory component of movement which enables continuous uninterrupted feeding of fruit to a position below each of the pitting tools 3 by the conveyor mechanism 9.

The power for operating the pitting mechanism is derived from an electric motor 11 supported on a bracket 13 mounted on the front end of the framework 15 of the machine to the front of the housing 7. The motor is chain connected through a drive shaft sprocket 17 to a main drive shaft 19 on which is mounted a pinion 21, and this pinion in turn meshes with a speed reduction gear 23 located in the housing 7 on an auxiliary shaft 25 extending through the housing 7 and beyond both sides thereof. In imparting the oscillatory component of movement to the pitting tool assembly, the pitting tool assembly is oscillated about this auxiliary shaft 25.

Supported just below the pitting tools 3 on either side of the housing 7 is a stripper plate supporting channel 27 having openings 29 therethrough in alinement with the pitting tools 3 with which it is associated. Across these openings are affixed stripper plates 31, each having perforations 33 therethrough, the perforations appearing beneath each opening 29, conforming with the cross-section of the pitting tool 3 above it, thus enabling clear passage of the pitting tool therethrough with but very little clearance.

The stripper plate supporting channels 27 are each an integral part of like brackets 35 which pivot about the auxiliary shaft 25. These stripper plate channels are maintained in permanent alinement with the reciprocating pitting tools 3, by a pair of guide members 37, one for each bracket. Each guide member 37 is bolted at one end to the pitting tool cross arm 1 and is reciprocally fitted in a member 38 pivoted on the auxiliary shaft alongside the housing 7 and affixed to the adjacent bracket 25, carrying a stripper plate channel 27. The stripper plates 31 are thus caused to oscillate in unison with the pitting tools 3 about the auxiliary shaft 25 and will thereby always be maintained in alinement with the pitting tools 3.

The fruit to be pitted is conveyed individually to a position beneath one or the other of the pitting tools by the conveyor 9 including a plurality of conveyor chains 39 equal in number to the number of pitting tools 3 with which the machine is provided. Each conveyor chain includes a plurality of links, the alternate links of which carry rubber cups 41 having perforated flexible bottoms 43, each cup being of a size designed to carry an individual fruit. The chains are positioned side by side in accordance with the lateral spacing of the pitting tools 3 and are simultaneously driven from sprockets 45, one on either side of the housing 7, and mounted on the ends of the auxiliary shaft 25 extending beyond either side of the housing 7.

The conveyor chains are driven at a continuous and uniform speed through engagement with the sprocket teeth 47, at a rate such that successive conveyor cups 41 on the chains will arrive in unison beneath the pitting tools during successive pitting strokes of such tools. Upon arriving in such position and without interruption to their movement, the pitting tools descend simultaneously and each enters the fruit carried by the cup below it, forcing the pit out of the fruit and through the perforation in the flexible bottom of the conveyor cup which carries the fruit. Upon completion of the pitting stroke, the tools are withdrawn and returned to their initial starting position in preparation for the following pitting stroke, which is timed to occur with the arrival of the next arriving conveyor cups below the pitting tools. During the return movement of the pitting tools 3, the fruit which will invariably adhere to the pitting tools, is stripped therefrom, upon coming in contact with tthe stripped plates 31, and prior to the application of my invention to such a machine, such fruit would be permitted to drop and roll from the end of the conveyor, into a receptacle suitably placed for catching such fruit. The pits which have previously been ejected from the fruit and forced through the perforated bottom of the conveyor cup would, prior to my invention, be permitted to drop within the conveyor sprockets and conducted out through the open end thereof. It will be apparent, therefore, that in the event the fruit for some reason or other were not successfully pitted, such fruit would nevertheless be discharged into the same receptacle with the successfully pitted fruit and retained as part of the product of the machine.

In accordance with my invention, I individually control the output of each pitting tool 3 and cooperating conveyor chain by providing alternate discharge routes for the fruit operated on by each pitting tool. Such alternate routes are located at the end of each conveyor chain in line therewith and are controlled through the operation of a trap door 49, which is normally maintained in one position against a baffle 50, so long as the pitting operations of its associated pitting tool are successful in ejecting the pits from the fruit being operated upon.

Upon failure of such pitting tool to successfully remove the pit from any individual fruit, the trap door in line therewith is caused to spring open, and such trap door response is so timed as to cause the unsuccessfully pitted fruit to take the alternate discharge route to a separate receptacle placed at the discharge end of such route for such purpose.

The machine disclosed in Fig. 1 being provided with similar pitting and conveying mechanisms on either side of the housing, all further description will be directed to the invention, in connection with the mechanism on one side of the machine, it being understood that the construction of the machine, being similar on the other side of the housing, the invention is applied thereto in like manner.

Inasmuch as the success or failure of one pitting tool to eject the pit from an individual fruit will be independent of the success or failure of the pitting operation of the other pitting tools, it is essential that the trap doors 49 be capable of operation independently of each other and should be individually responsive to the results of its associated pitting tool. At the same time it is desirable that they be pivoted on the same axis. In order to support these trap doors on the same axis and at the same time realize independence of control of operation, the trap doors are mounted on concentric shafts 51, 53, 55, 57 etc., the number being determined by the number of trap doors, which in turn depends upon the number of pitting tools and conveyor chains carried by the machine. The shaft 51 of smallest diameter is made longer than the others and has one end thereof anchored to the side wall of the housing 7. Each of the successively larger diameter shafts 53, 55 and 57 exposes sufficient of the shaft of next smaller diameter to provide space for attachment of one of the trap doors, a trap door also being affixed to the shaft 57 of largest diameter in the machine as illustrated. These concentric shafts extend into and are journaled for support in a housing 59 affixed to the side of the machine, in which housing is located a plurality of similar latching assemblies 61 individually associated with the shafts to which the trap door are connected. These latching assemblies in the housing 59 control the independent operation of the trap doors 49 in response to the results of the pitting operations of the respective pitting tools 3 with which the trap doors are in alinement.

To obtain a clear understanding of the manner in which the trap doors are controlled, it will now be desirable to refer back to the sprocket 45 which drives the conveyor 9, and describe its construction and that of associated apparatus, and the manner in which it ties in with the latching assemblies 61 in the housing 59 to control the operation of these trap doors 49.

The sprocket 45 is a hollow drum shaped member having a plurality of rows of sprocket teeth 47 previously indicated, the number of rows agreeing in number with the number of pitting tools 3 and conveyor chains 39 on the machine. In cross section the sprocket is polygonal in shape, the spacing between the teeth being sufficient to receive the alternate links of each chain which carry the conveyor cups 41. At those points on the sprocket which engage the cup carrying links, the sprocket is provided with openings 63 therethrough in which are fitted cylindrical inserts 65 having one end flush with the outer or chain contacting surface of the sprocket, and the other end extending a short distance beyond the inner surface of the sprocket. This inner extended portion of each of the inserts 65 is formed with a plurality of slots 67 in the direction of rotation of the sprocket.

The sprocket 45 is closed at one end, at which end, it is provided with an inwardly directed hollow shank 69 to receive an end of the auxiliary shaft 25 for mounting the sprocket thereon. The sprocket thus is operated through the auxiliary shaft 25 and rotates in accordance therewith.

Within the sprocket, there is mounted a stationary cylinder 71. This cylinder is provided with a partition wall 73 which has a central opening therethrough enabling it to slidably fit over a sleeve bearing 75 carried by the inwardly directed hollow shank 69 of the sprocket and such partition constitutes the mounting support for one end of this stationary cylinder 71, enabling it to remain stationary while the sprocket 45 is permitted to rotate. The bearing 75 overhangs the end of the inwardly directed hollow shank 69 to receive a flanged bushing 77 which is fixed in engagement against the cylinder partition 73 by a shaft extension 79 having a reduced end portion 81 passing through the bushing 77 and threaded to the end of the auxiliary shaft 25. The other end of the stationary cylinder 71 is rigidly supported by a ring or collar clamp 83 spaced from the open end of the sprocket 45 and affixed to a stationary part of the machine such as the housing 59.

A depending bearing 85 at the ring clamped end of the cylinder 71 and the partition wall 73 together provide bearing means for supporting a plurality of concentric shafts 87, 89, 91, 93, corresponding in number and position to the aforementioned concentric shafts 51, 53, 55 and 57 on which the trap doors 49 were previously described as being individually affixed. Each of these concentric shafts has affixed thereto a pivot arm 95 to the end of each of which is attached a plurality of the rotatable discs 97 equal in number to the number of slots 67 formed in the end of each of the cylindrical inserts 65 and spaced accordingly.

Such pivot arms 95 and discs 97 are positioned on their respective shafts so that the discs will be in line with the slots 67 in the ends of the aforementioned inserts 65, and the stationary cylinder 71 is formed with openings 99 therethrough, providing exits through which the discs 97 might swing or oscillate.

The concentric shafts 87, 89, 91 and 93 extend beyond the open end of the sprocket 45, the shaft 93 of largest diameter extending but a short distance, and each shaft of next smaller diameter extending a greater distance for attachment of a link 101 to each of the shafts 87, 89, 91 and 93 to enable angular movement of the shafts independently of each other. Each link 101 is pivotally connected by another link 103, extending into the housing 59 through an opening 105 in the rear wall 107 thereof, to a trip link 109 which in turn is pivotally connected to the cross member 111 of a pair of interconnected parallel links 113 pivotally anchored to a shaft 115 journaled to the side wall 117 and cover 119 of the housing 59.

The trip links 109 are arranged side by side as viewed from the front of the machine and are all pivoted to the same cross member 111. Each of such trip links is provided with a weighted offset 121 extending from the trip link toward the front of the housing 59 and tending to tip or rotate the trip link in the direction of the front wall of the housing about the cross member 111 as the axis of rotation. When the effect of this weighted off-set is traced back through the connecting links to the rotatable discs 97 associated therewith, it will be noted that the weighted offset acting through these link connections will continually urge the discs outwardly in the direction of the sprocket 45, and consequently such discs will roll against the inner surface of the sprocket in response to rotation of the sprocket. The forward movement of the trip links 109 will therefore be limited in the normal course of events by the inner surface of the sprocket while in abutment thereagainst, except under certain conditions to be explained, when the openings 63 in the sprocket arrive in alinement with the discs.

A rectangular shaped yoke 123, spans the interconnected parallel links 113 which in turn rest on a roller 125 carried between the side members of the yoke. The yoke 123 is fixedly attached to a shaft 127 which extends across the front end of the machine and through the lower portion of the housing 59. The yoke is adjusted at an angle with respect to the vertical, whereby when the shaft to which it is fixed, is rotated through a small angle in a counter-clockwise direction as viewed in Fig. 2, the interconnected links 113 will be raised through a small angle and such movement of the links 113 will in turn lift all the trip links 109 simultaneously through a short distance. The shaft 127 is periodically oscillated through such an angle in a counter-clockwise direction with respect to the position of the yoke indicated in Fig. 2, by a cam arrangement.

The cam constitutes a fork-like member 129 with an internal cam surface 131 and a lever arm 133 for connection to the shaft 127, the cam surface 131 bearing against a cam follower 135 mounted on a side of the chain drive gear 17 of the main drive shaft 19 but off-center with respect to said shaft. For each revolution of the main drive shaft, therefore, the yoke will define one oscillation in response to the cam action and consequently will lift the trip links 109 once during each rotation of the main drive shaft and permitting them to drop back to their original position between lifts.

The cam is freely connected to the shaft 127 but is restrained against pivotal movement with respect thereto by an adjustable restraining member 137 fixed to the shaft 127 by a set screw 139 and adaptable through manipulation of additional set screws 141 and 143 adjustably mounted on integral overhanging extensions 145 and 147, to vary the angular position of the cam lever 133 with respect to the yoke 123 for obtaining a proper degree of movement of the respective elements whose movement is controlled by cam 129.

Figure 2:
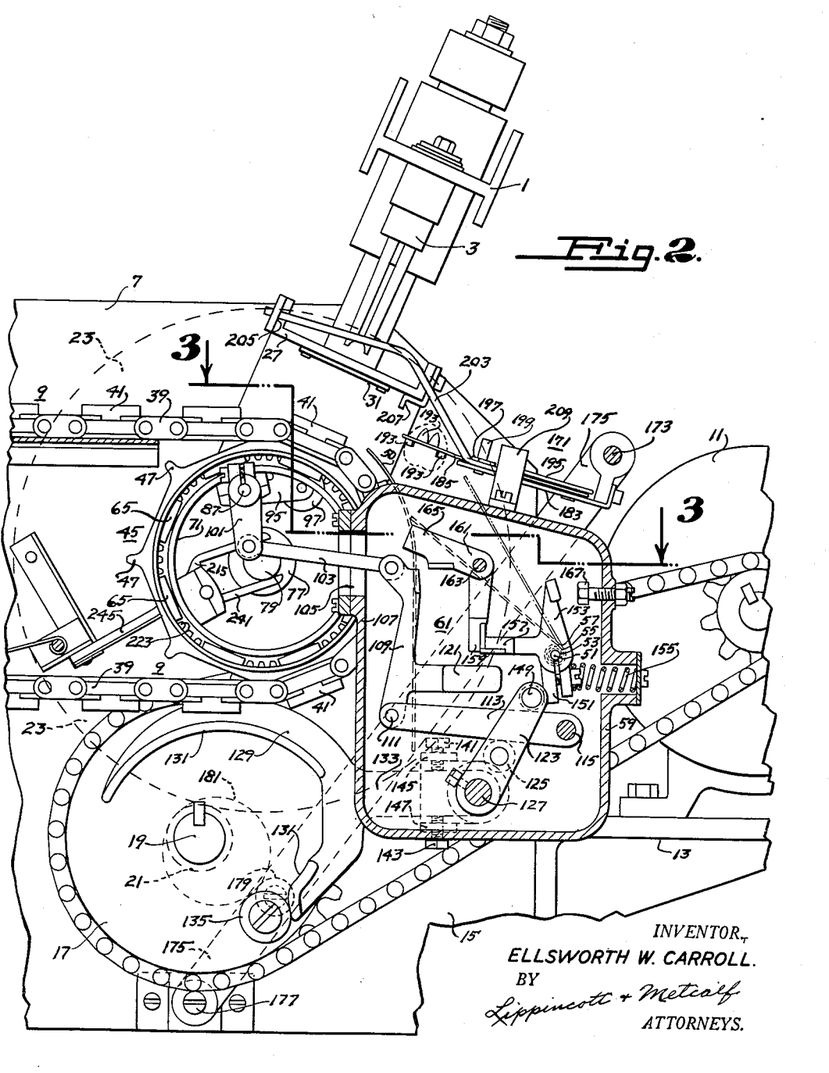
Fig. 2 is a side elevational view of the improved portion of the machine, partly in section, disclosing the invention and its relationship to the pitting mechanism, and showing elements of the invention as they appear following a successful pitting operation.
Figure 3:
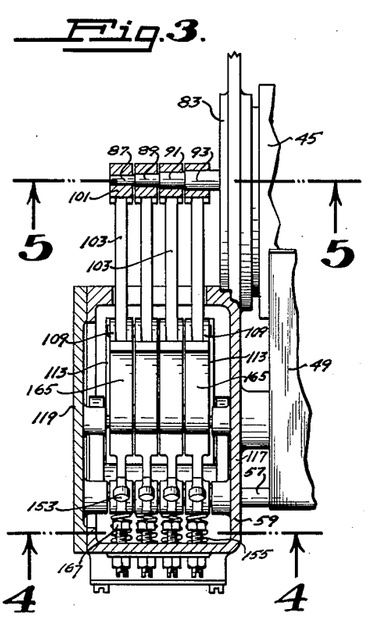
Fig. 3 is a view partly in section taken in the planes 3—3 of Fig. 2.
Figure 4:
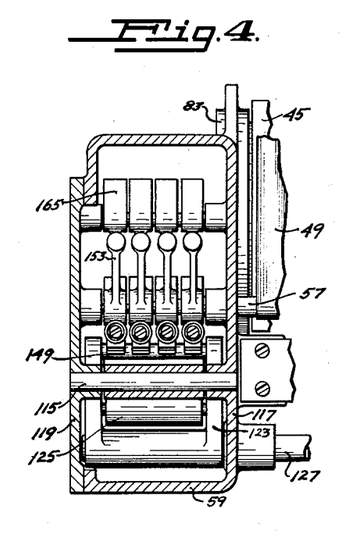
Fig. 4 is a view partly in section taken along the lines 4—4 of Fig. 3.
Figure 5:
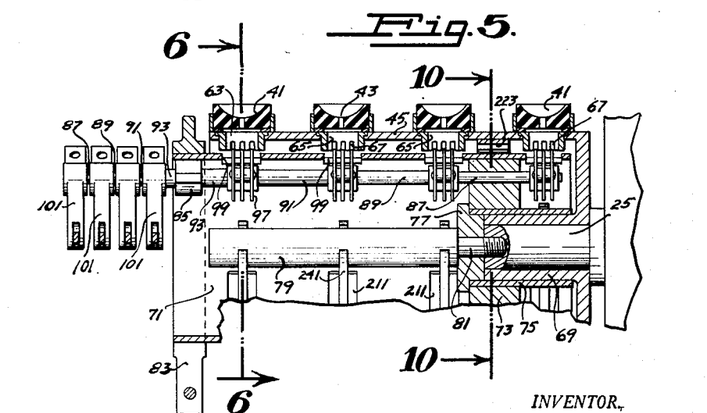
Fig. 5 is a view partly in section looking in the direction 5—5 of Fig. 3.

From a glance at Figs. 1 and 2, it will be noted that while the yoke 123 is mounted on that portion of the shaft 127 extending through the housing, the cam 129 which determines the oscillatory movement of the shaft 127 is positioned adjacent the drive connection from the motor 11 to the main drive shaft 19.

During oscillatory movement of the yoke 123, the free end portion 149 will periodically strike against depending reset arms 151 of a plurality of latch elements 153, with sufficient force to overcome the opposing force of a coil spring 155 for each latch element, anchored in the front wall of the housing and exerting pressure against the depending reset arms. Each of such latch elements is fixedly connected or clamped to one of the concentric shafts 51, 53, 55 and 57 to which the trap doors 49 are connected. These concentric shafts extend into the housing 59 in the same order and same manner as the concentric shafts 87, 89, 91 and 93, extending from within the sprocket 45. Thus, the exposed portions of the concentric shafts 51, 53, 55 and 57 provide space for attachment of the aforementioned latch elements 153 thereto, thereby enabling individual oscillation of the concentric shafts 51, 53, 55 and 57 through operation of individual latch elements 153. Each of the latch elements has a latch arm 157 which in latching position, engages the holding end 159 of a bell crank 161 pivoted on a shaft 163 journaled in the wall 117 and cover 119 of the housing 59 above an associated trip link 109, a latching element 153 being thus held against the unlatching force of a spring 155 which had previously been compressed by the action of the yoke 123 in striking the arm 151 of the latching element to swing the latching element 153 into latching position. The other arm 165 of each bell crank 161 occupies a position to the front of an associated trip link 109 and just out of reach thereof.

Each of the latching elements 153 is provided with an adjustable stop 167 in the front wall of the housing 59 and inasmuch as each latching element is connected through one of the concentric shafts 51, 53, 55 or 59 with one of the trap doors 49, it will become apparent that through adjustment of its associated adjustable stop 163, the angle through which a trap door may be sprung upon unlatching a latching member, can be controlled.

Before proceeding further with the description of the apparatus involved in the present invention, it might be well to summarize the operation of the latching mechanism just described.

As previously stated, due to the weighted trip links 109 acting through links 103, 101 etc., the rotatable discs 97 will normally bear against the inner surface of the rotating sprocket 45, passage through the inner extending ends of cylindrical inserts 65 being permitted by the slots 67 formed therein. Upon engaging such inserts, the rollers will be urged into the openings provided through the sprocket 45, by the weighted arms 121 of the trip links 109. Inasmuch as the forward movement of the trip links was previously restricted by the engagement of the rotatable discs against the inner surface of the sprocket, the added freedom offered to movement of the discs by the openings through the sprocket will permit the weighted trip links to drop forward through a slight angle, bringing the upper end of such trip links beneath the adjacent arms 165 of the bell cranks 161. It will be recalled that the trip links 109 are continually being oscillated in a vertical direction by the cam 129 acting through the yoke 123 and the interconnected parallel links 113, and consequently when the trip links drop forward so that their upper ends are beneath their associated bell cranks, the simultaneous upward movement of the trip links will cause them to strike the bell cranks and trip the latching elements 153, whereby due to the action of the springs 155, the latching members 153 will operate through the concentric shafts 51, 53, 55 and 57 to open the trap doors 49 to which they are connected by such concentric shafts. Continued rotation of the sprocket will bring the rotatable discs again in contact with the inner surface thereof and re-establish the trip links in their original positions. In the meantime the cam 129 causes the yoke 123 to strike the latch arms 151 and reset all the latching mechanisms and trap doors until the discs encounter the succeeding opening through the sprocket 45.

Simultaneous operation of all the latch mechanisms, as just described, will occur during operating of the machine in the absence of any fruit being fed to the pitting apparatus. By reason of the construction of the latching mechanisms however, they are capable of operation independently of each other, and such independent operation does occur in response to the results of the pitting operations of the individual pitting tools, when fruit is fed to the pitting apparatus. For example, it will be apparent that as long as the rotatable discs are not permitted to swing into any one of the openings provided through the sprocket, during rotation of the sprocket, each latching mechanism will be maintained in its latched condition, by reason of the fact that its trip link 109 will never be permitted to drop forward and strike the bell crank lever above it during one of its upward stroke movements. During the normal course of events, as long as fruit is being successfully pitted, this condition obtains, since a pit during each pitting stroke, will be forced by the pitting tool through the perforation in the flexible bottom of the rubber cup into the opening through the sprocket. The presence of such a pit in an opening, will serve to preclude the rollers from swinging into such opening and consequently will preclude the trip link from swinging forward and tripping the latching mechanism.

The pitting operation occurs just prior to the time when a set of rotatable discs 97 enters a cylindrical insert 65 by way of the slots 67 provided therein. In order to prevent the pit from dropping from the compartment defined by such cylindrical insert, before the discs have an opportunity to enter, the lever 95 which supports the rotatable discs is formed with a tail portion 169, and this tail portion serves to hold the pit in the compartment until movement of the sprocket brings the discs into alinement with the opening.

For successful operation of the apparatus thus far described, one cannot depend upon the fruit reaching the discharge route at the proper time, if it be permitted to roll due to the gravity, from the end of the conveyor mechanism as had previously been the practice, prior to my invention. Its arrival at a trap door 49 must be timed with respect to the probable operation of such trap door. Otherwise its arrival might occur too soon or too late with respect to an operation of the trap door and such fruit might be discharged along the wrong discharge route.

To obtain proper timed arrival of the fruit for discharge to the desired route, depending upon whether such fruit has been successfully or unsuccessfully pitted, I have provided a fruit snatching mechanism 171, which grasps the fruit subsequent to the pitting operation, removes such fruit from the cups 41 and the pitting tools 3, and drops them at the proper moment into the discharge routes provided therefor by the operation of the trap doors 49.

The snatching mechanism comprises a bar 173 extending across the front of the machine at approximately the level of the conveyor chains 39, and supported on a pair of pivot arms 175 which are pivoted at points 177 on the frame below the main drive shaft 19. One of the pivot arms is provided at an intermediate point with a cam follower 179 which is maintained against the surface of a circular cam 181 eccentrically mounted on the main drive shaft 19 adjacent the main drive shaft sprocket 17.

This cam arrangement will produce an angular oscillatory movement of the cross-bar 173 in a direction toward and away from the pitting apparatus.

Pivotally connected to the cross arm 173 is a plate 183 on which are mounted a plurality of snatchers 185, one for each pitting tool and supported in line therewith. Each of the snatchers comprises a pair of opposed clamping members 187 pivoted at one end 189 to the plate 183 and extending in the direction of a pitting tool. Each of the clamping members at the fruit engaging end is provided with a fruit engaging jaw formed by an arcuate shaped end 191 having integrally upturned and downturned tabs 193, the clamping members being biased toward each other into clamping position by a U-shaped spring 195 having its ends anchored at approximately the midpoint of the clamping members. A pair of links 197 each pivotally anchored at one end to one of the clamping members of a snatcher at an intermediate point thereon, are at their other ends pivotally connected together at an angle by a pin 199, one end of which extends into a guide slot 201 in the plate 183, while the other end extends above the snatcher. Such construction provides toggle action for spreading the clamping members of a snatcher against the action of the spring 195 and maintaining such snatcher in open position.

Figure 8:
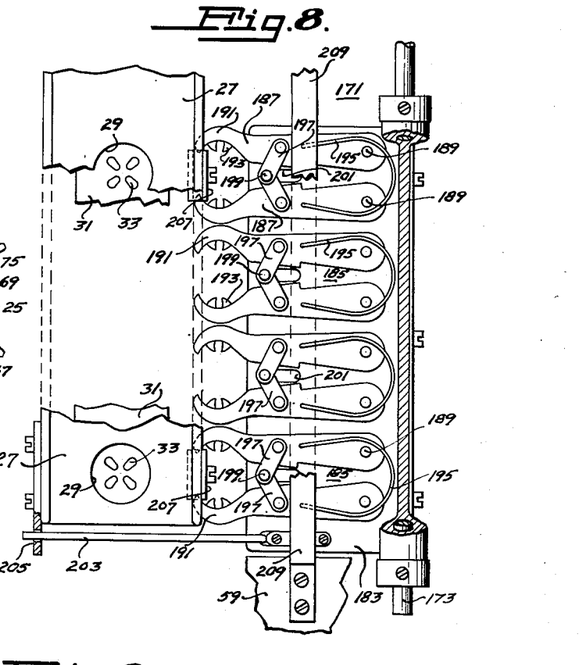
Fig. 8 is a plan view of fruit snatching mechanism, comprising an important feature of the present invention.
Figure 9:
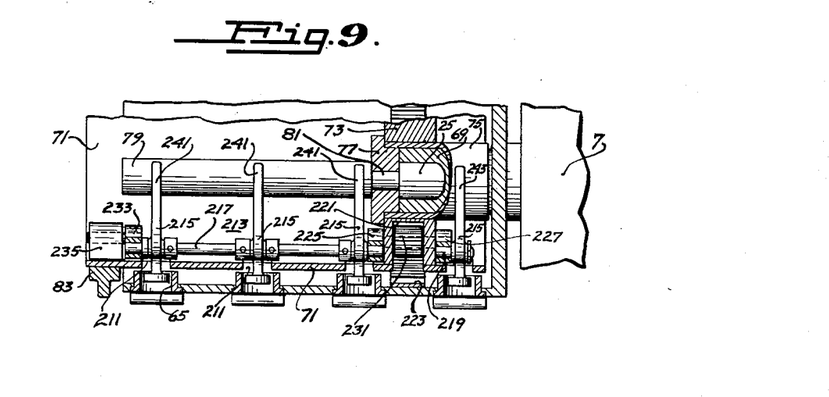
Fig. 9 is a view partly in section taken approximately along the line 9—9 of Fig. 6.
Figure 10:
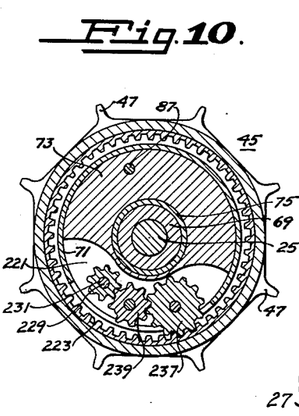
Fig. 10 is a view in section taken along the line 10—10 of Fig. 5.

The snatcher assembly comprising the snatchers 185 and mounting plate 183 is supported in operating position by a guide wire 203 attached to the plate 183 at one end thereof and resting in a slotted guide 205 attached to the stripper plate channel 27. The dimensions of the snatcher mechanism are such that during the forward movement of the mechanism, the fruit engaging end of each snatcher, will extend to the position occupied by a fruit at the completion of a pitting operation, and upon return movement, the fruit engaging end of each snatcher will come to a halt above one of the trap doors 49. The guide wire 203 which supports the snatcher assembly in operating position is bent so as to cause the snatchers 185 to execute a desired approach in preparation to picking up pitted fruit following a pitting operation, the snatchers approaching the fruit with jaws open as indicated in Fig. 8.

In order to cause the snatchers to open and close at the proper moments, the forward edge of the stripper plate channel is provided with a plurality of abutments 207, in line with the upwardly extending pivot pins 199 of the snatchers. The forward approach of the snatchers 185 toward the fruit, as determined by the guide wire 203, is such that the pivot pins 199 will strike against the abutments 207, after the open jaws of the snatchers have encircled the fruit. The abutment of the pins against the abutments brings about operation of the toggle mechanisms of the snatchers, permitting the springs 195 associated therewith to close the snatchers upon the fruit. The fruit is accordingly thus engaged by the snatchers, permitting withdrawal of the pitting tools therefrom, and such fruit is withdrawn on the return movement of the snatcher assembly to a position above the trap doors as previously indicated. The snatchers, thus, not only serve to remove the fruit and deposit the same at uniform time intervals, but take on the function of the stripper plates in permitting withdrawal of the pitting tools from the fruit. The stripper plates however, may be retained as a safety measure to assure removal of fruit from the pitting tools in the event that a snatcher should fail to successfully grasp an item of fruit which it goes after.

Upon approaching the fruit discharge position, the pivot pins 199 are caused to strike against a release bar 209 which is attached at one end to the upper surface of the housing 59 and extends across the snatcher assembly in spaced relationship thereto. The striking of the pivot pins against this release bar upon the return movement of the snatcher assembly, flips the toggle mechanism of each snatcher, causing each snatcher to open up against the action of its spring, thereby releasing such fruit as may be held between the jaws of such snatcher. The fruit accordingly, will drop into such discharge route as has been exposed by operation of the trap doors immediately below.

In the meantime, the pits as they are ejected from the fruit during pitting operations, are carried along with the movement of the sprocket 45 until an opening in which one may have been deposited, arrives in alinement with an opening 211 through the stationary cylinder 71, at which point pit expelling mechanism 213, located within the cylinder 71, functions to expel the pit from the cylindrical insert 65 which houses it.

Such pit expelling mechanism embodies a plurality of ejector elements 215, one for each circular row of sprocket openings 63. These elements are pivotally supported on shafts 217 and 219 which are crank operated through a chain of gears housed within a groove 221 formed in edge of the partition 73 and meshing with an internal ring gear 223 located within the sprocket 45 in the median plane of the partition 73. The cranks 225 and 227 which operate these ejector members 215 are located one on each side of the partition 73 and are fixed to a drive shaft 229 extending therethrough, on which is located the final gear 231 of the gear train. The shaft 217 spans the majority of the openings in the sprocket in the machine illustrated due to the location of the partition 73 toward the closed end of the sprocket 45 and such shaft finds additional support by having its other end anchored in a similar crank 233 which is pivoted in a bearing 235 adjacent the open end of the stationary cylinder 71. The gear train which controls operation of the ejectors, include not only the final gear or pinion 231 on the crank shaft 229, and a gear 237 which meshes with the ring gear 223, but also an immediate idler reversing gear or pinion 239 which effects rotation of the crank shaft pinion 231 in such direction that the cranking movement will cause the ejector members 215 to swing along in the direction of movement of the sprocket 45 during the ejection stroke of the elements 215. The openings 211 in the stationary cylinder through which the ejectors operate are made sufficiently long in a circumferential direction as to enable this swing movement of the ejectors in synchronism with the movement of the sprocket. Each of the ejector members on the longer shaft 217 is guided in its ejector stroke by being provided with a guide in the form of a slotted tail portion 241, which spans the extension 79 to the auxiliary shaft 25, and rides thereon. The ejector member located on the shorter shaft 219 is provided with a similar slotted guide portion 243 having a wider span to engage the sleeve bearing 75 provided on the end of the auxiliary shaft 25, which is of greater diameter than the shaft extension 79 previously referred to.

Inasmuch as the pits expelled from the fruit are apt to be quite sticky and adhere to the ejector members, I provide a flipping or wiping device for each ejector member which functions to remove the pits from the ends of such ejector members when each ejector has approached the limit of its ejection stroke. Such wiper device comprises a strip 245 of flexible material such as rubber, leather or the like resiliently maintained against the sprocket surface, with the resilient wiping element contacting the sprocket surface at approximately the location where its associated ejector member functions. The wiping action occurs during that portion of the ejector travel, when such ejector is moving in the direction of movement of the sprocket concurrently with the completion of its ejection stroke.

It will be noted that the resilient wiping element 245 is flexed during passage of the sprocket teeth 47 thereby and upon such a tooth arriving at a point beyond reach of the wiping element, the wiping element due to its being previously flexed, will snap back to normal position and in so doing will flick such pit from the end of the ejector element as may adhere thereto. The pits thus ejected will either fall to the floor or ride the sprocket contacting surface of the conveyor chains 39. Those that ride the chains are subsequently guided off the chains by a blade 247 obliquely disposed across the chains in the path of movement of the pits.

For proper operation of the invention, proper coordination and synchronization must be maintained among the various operating mechanisms embodied in the invention. There must be proper coordination for example, between the movements of the pitting tools 3, the rotation of the sprocket 45, the movement of the snatching mechanism 171, the operation of the trap doors 49 and the operation of the ejector mechanism 213. The proper timing and coordination among the various mechanisms referred to will now be emphasized in connection with the drawings to which reference will be made.

Figure 6:
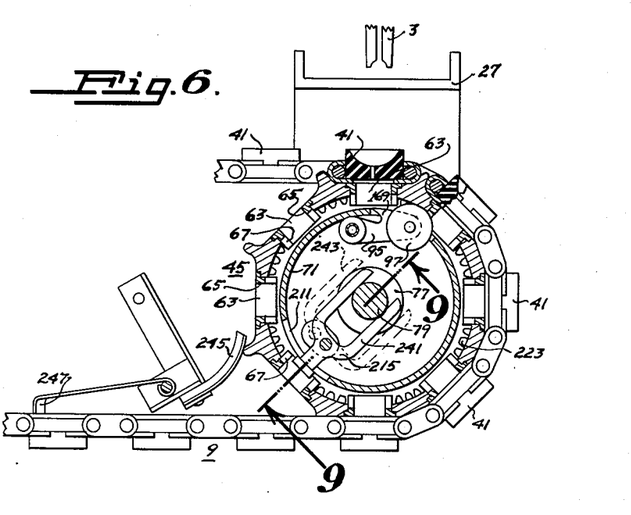
Fig. 6 is a view taken along the line of 6—6 of Fig. 5.

In Fig. 6, a fruit carrying cup 41 is shown as having arrived beneath a pitting tool 3, and the particular pitting tool at the moment is beginning its downward pitting stroke. The latching mechanism associated therewith is in its latched condition as indicated in Fig. 2, in which condition the trap door 49 controlled thereby will be closed against the baffle plate 50. The sprocket 45 is moving in a clock-wise direction as viewed in Fig. 6, and following a successful pitting operation, a pit will be ejected into the opening 63 in the sprocket beneath the fruit carrying cup 41. Due to the clock-wise movement of the sprocket, the pit will be carried in the direction of the discs 97 and will be retained in the opening 63 until reaching the discs, by the tail formation 169 of the lever 95 which supports those discs. Upon passing over the discs, the discs will be prevented from swinging into the opening by the presence of the pit and accordingly will remain more or less stationary in the position indicated in Fig. 6.

Consequently the trip link 109 to which the discs 97 are linked will remain in the position indicated in Fig. 2, but in a state of vertical oscillation due to the action of the cam 129, and no tripping of the latch mechanism will occur. Therefore, the trap door 49 will remain in its closed position against the baffle 50.

In the meantime the snatcher mechanism 171 will have moved forward and a snatcher device 185 will have closed upon the fruit which has just been successfully pitted. Withdrawal of the pitting tool 3 occurs simultaneously therewith, and the pitted fruit 15 carried to a position above the trap door 49 and released. Due to the fact that the trap door has remained closed against the baffle 50, the pitted fruit will take a discharge path provided by the trap door, which acts as an incline, and accordingly will roll down such incline and drop into a suitable receptacle provided to catch the same.

Figure 7:
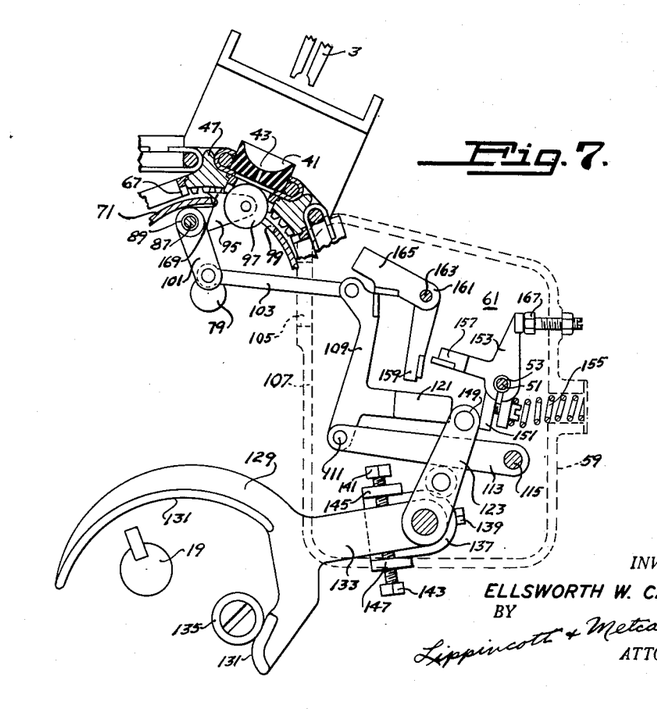
Fig. 7 is a view showing the pertinent elements of Fig. 2 in the position occupied following an unsuccessful pitting operation.

Now let us assume that the fruit which has been operated on by the pitting tool has not been successfully pitted. In such case, no pit will be ejected into the opening beneath the fruit carrying cup 41. Upon moving into alignment with the disc 97, the discs will have free access to the opening and will thus permit free forward or tipping movement of the trip link 109 through a small angle, sufficient to bring the upper end of the trip link below the arm 165 of the bell crank 161 of the latching mechanism. The trip link it will be recalled, is maintained in constant vertical oscillation. Thus the vertical movement of the trip link will cause the trip link to strike the arm 165 of the bell crank 161 and release the latching member 153, as indicated in Fig. 7, causing the trap door 49 associated with that particular latching member to fly open and expose a discharge route between such trap door and the baffle 50. In the meantime the snatcher mechanism will have removed the fruit in the same manner and to the same position as previously indicated, at which point the fruit is released. The timing is such that the snatcher mechanism reaches the point of release following the operation of the latching mechanism. Consequently, when the fruit is released, it will take that discharge path provided by the operation of the trap door, whereupon the fruit will drop between the baffle 50 and the trap door 49 into an independent receptacle provided for receiving such unpitted fruit.

Following the tripping of the latch mechanism, the latch mechanism will be reset through the operation of the cam operated yoke 123, which strikes the latching member 153, thus restoring the trap door 49 to its normally maintained position against the baffle 50.

The reduction ratio between the main drive shaft pinion 21 and the auxiliary shaft gear 23 is in proportion to the number of pitting strokes per rotation of the sprocket 45 or can be considered as proportional to the number of openings 63 in a circular row about the sprocket. This ratio is maintained so that the reset mechanism strikes all the latch elements once for every pitting stroke, thereby resetting those which may have been previously unlatched. The cam is adjusted to bring about such reset operation immediately following the release of fruit by the snatchers and in time to restore the apparatus for the following pitting operation.

Figure 11:
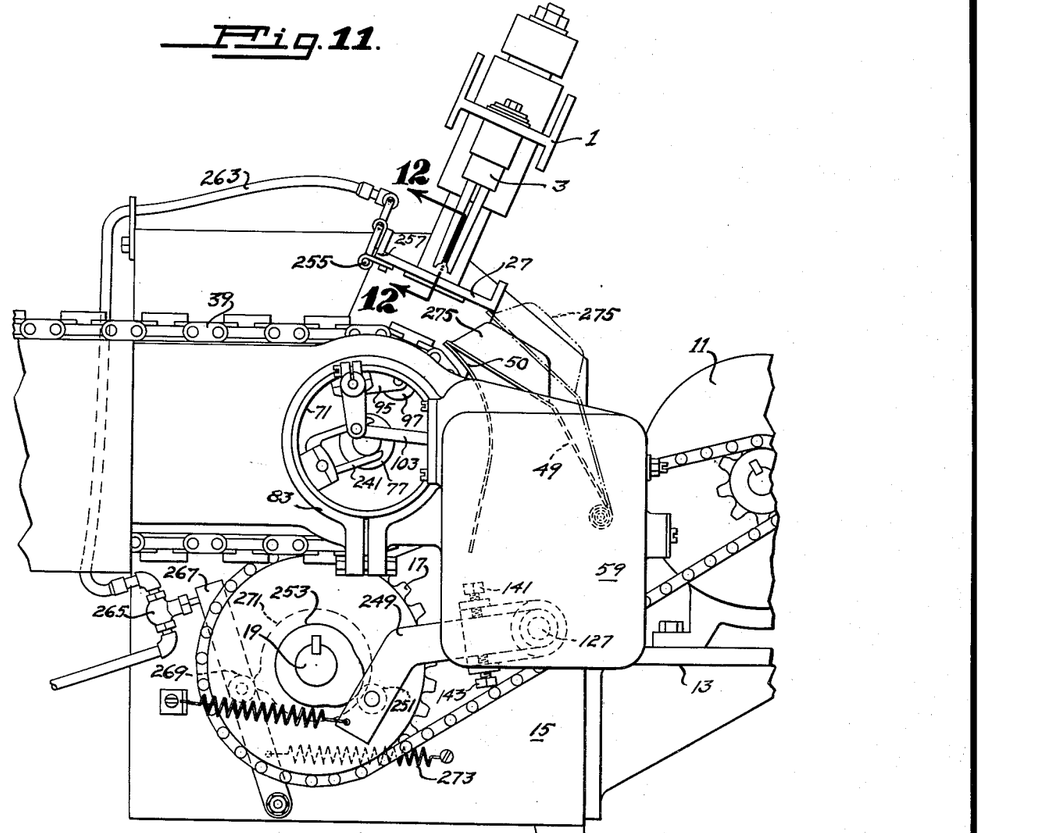
Fig. 11 is a view corresponding to Fig. 2 but somewhat modified.
Figure 12:
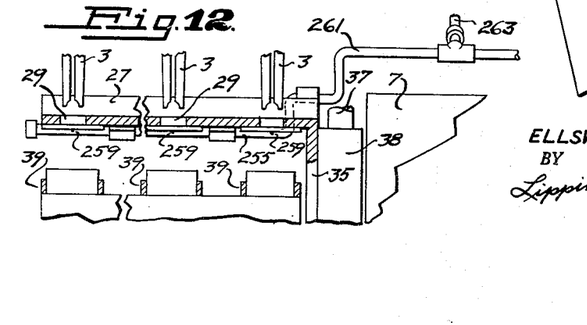
Fig. 12 is a view looking in the direction of line 12—12 of Fig. 11.

The modified apparatus of Figs. 11 and 12 is similar to that of Fig. 2 and has many elements in common therewith which in the drawings, have been designated by similar reference numerals. This embodiment however has been simplified considerably without impairing the ability of the machine to perform all the functions attributed to the construction of Fig. 2 previously described.

In one minor respect a simplification has been accomplished in the cam mechanism for operating the yoke 123. In lieu of employing a forked cam such as cam 129 of Fig. 2, and controlling its movement by a cam follower attached to the main drive shaft sprocket 17, the cam and cam follower elements are in effect reversed, enabling the elimination of the forked cam 129 of Fig. 2. The cam follower in the construction of Fig. 11 is affixed to the member 249 corresponding to the lever arm 133 of Fig. 2, which member is spring biased to bring the cam follower 251 into contact with the surface of a simple cam 253 keyed to the main drive shaft.

The major change from the construction of Fig. 2 however, resides in the complete elimination of the snatcher mechanism, the function of which is taken care of in a very simplified manner through timed operation of an air blast, which at the proper moment blows the fruit into the proper discharge route which has been opened thereto. To obtain such timed controlled air blasts, a pipe 255 is supported along and just below the rear edge 257 of the stripper plate mounting channel 27, this pipe being provided with perforations 259 in line with the conveyor chains 39 or the discharge routes as controlled by the trap doors 49. A pipe of this character is similarly mounted on the stripper plate channel for the other half of the machine, these pipes being joined in a yoke 261 over the housing 7, at which point, they are connected by a flexible hose 263 through a valve 265 to a source of compressed air (not shown) which may be either a tank of compressed air or a pump. The air blasts occur during the withdrawal of the pitting tools 3 and at the precise moment when the fruit, which will have adhered to the pitting tools, is stripped therefrom by the passage of the pitting tools through the stripping plates 31. Such timing of the air blasts is controlled by a cam arrangement involving a valve operating lever 267 which is pivoted at one end to the frame of the machine and adapted in the course of its movement to strike the valve 265 and release air through the perforations 259. The valve operating lever is provided with a cam follower 269 at an intermediate point thereof, which is maintained against a cam 271 mounted on the main drive shaft 19, through the action of a biasing spring 273. The cam arrangement is so adjusted that at the moment when the fruit has been stripped from the pitting tools 3, the cam 271 will drive the valve operating lever 267 against the valve 265 and release the air. To assure that the air blasts will direct the fruit in the proper paths, the trap doors are provided with side guards 275 which will serve to better define the discharge routes and guide the fruit during discharge.

Aside from the above noted changes tending toward a simplified construction, the apparatus of Fig. 11 is similar to that of Fig. 2. It will be apparent that in both cases the apparatus is intended to perform the same functions and fulfill the same objects.

It will become apparent from the above detailed description of the invention that the trap doors are normally maintained in the position defining discharge routes for the successfully pitted fruit, and that the latch mechanisms are made responsive to the results of the pitting operations, in such manner that the latch mechanisms will be tripped and the trap doors associated therewith, will fly open and expose an alternate discharge route to receive the unsuccessfully pitted fruit.

The pits, and the unsuccessfully pitted fruit, in the meantime are discarded in such manner as to preclude possibility of their becoming mixed with the successfully pitted fruit.

While I have disclosed preferred embodiments of my invention in great detail, it will become apparent that the invention is subject to various other modifications and embodiments without departing from the principle of operation involved, I accordingly do not desire to be limited in my protection to the specific details disclosed, except as may be necessitated by the appended claims and the prior art.

I claim:

1. Fruit pitting machine comprising a fruit conveyor including a rotatable hollow sprocket having sprocket teeth and an opening through said sprocket between each pair of teeth, a conveyor chain encircling said sprocket and having individual resilient perforated bottom fruit carrying devices capable of meshing with said sprocket in alinement with said openings in the passage of said fruit carrying devices around said sprocket; pitting means mounted above said sprocket and adapted during pitting strokes to eject into said openings in said sprocket the pits from fruit carried thereto by said fruit carrying devices; a pair of alternative discharge routes for such fruit, and means controlled by the presence or absence of a pit in said openings for exposing one or the other of said discharge routes to such fruit as it is discharged from said machine.

2. Fruit pitting machine comprising a fruit conveyor including a rotatable hollow sprocket having sprocket teeth and an opening through said sprocket between each pair of teeth, a conveyor chain encircling said sprocket and having individual resilient perforated bottom fruit carrying devices capable of meshing with said sprocket in alinement with said openings in the passage of said fruit carrying devices around said sprocket; pitting means reciprocally mounted above said sprocket and adapted during pitting strokes to eject into said openings in said sprocket the pits from fruit carried thereto by said fruit carrying devices; means resiliently bearing against the inner surface of said sprocket in line with the path of travel of said openings therein during rotation of said sprocket and capable of fully entering any of said openings in the absence of a pit therein during passage of said openings past said resilient means, but precluded from fully entering any such openings by the presence of a pit therein; a pair of alternative discharge routes for such fruit; and means including said resilient means for exposing one or the other of said discharge routes to the output of said machine in accordance with the presence or absence of a pit in said openings.

3. Fruit pitting machine comprising a fruit conveyor including a rotatable hollow sprocket having sprocket teeth and an opening through said sprocket between each pair of teeth, a conveyor chain encircling said sprocket and having individual resilient perforated bottom fruit carrying devices capable of meshing with said sprocket in alinement with said openings in the passage of said fruit carrying devices around said sprocket; pitting means reciprocally mounted above said sprocket and adapted during pitting strokes to eject into said openings in said sprocket the pits from fruit carried thereto by said fruit carrying devices; means resiliently bearing against the inner surface of said sprocket in line with the path of travel of said openings therein during rotation of said sprocket and capable of fully entering any of said openings during passage of said openings by said resilient means in the absence of a pit in such openings, but precluded from fully entering any such openings by the presence of a pit therein, a pair of alternative discharge routes for such fruit, means including said resilient means for exposing one or the other of said discharge routes to the output of said machine in accordance with the presence or absence of a pit in said openings, and means for ejecting such pits from said openings following the operation of said discharge route exposing means.

4. Fruit pitting machine comprising a fruit conveyor including a rotatable hollow sprocket having sprocket teeth and an opening through said sprocket between each pair of teeth, a stationary cylinder supported within said sprocket and concentrically therewith to provide a spaced bottom for said openings, a conveyor chain encircling said sprocket and having individual resilient perforated bottom fruit carrying devices capable of meshing with said sprocket in alinement with said openings in the passage of said fruit carrying devices around said sprocket; pitting means reciprocally mounted above said sprocket and adapted during pitting strokes to eject into said openings in said sprocket the pits from fruit carried thereto by said fruit carrying devices, a plurality of rotatable discs mounted at the end of a lever affixed to a rotatable shaft within said stationary cylinder and enabling said discs to protrude through an opening in said stationary cylinder and bear against the inner surface of said sprocket in line with the path of travel of said openings therein during rotation of said sprocket, said discs being capable of entering any of said openings during passage of said openings past said discs in the absence of a pit in such openings, but precluded from entering any such openings by the presence of a pit therein, a pair of alternative discharge routes for such fruit, a trap door for selectively closing one of said alternative routes and exposing the other, latching means for normally retaining said trap door in closed position with respect to one of said alternative routes, a trip member linked to said lever through said rotatable shaft and precluded from tripping said latching means by the presence of pits in said openings, and means operable in the absence of a pit in one of said openings following a pitting operation, for urging said trip member to a tripping position, thereby releasing said latching means and exposing the alternative discharge route.

5. In a fruit pitting machine, an endless conveyor having a plurality of fruit receptacles carried thereby, means for successively pitting fruit loaded in said receptacles, a pair of alternate discharge paths, one to receive fruit resulting from a successful pitting operation, the other to receive fruit resulting from an unsuccessful pitting operation, means for normally blocking one of said paths, said means being normally latched in such blocking position against a spring tending to shift said means to open the blocked passage and block the normally open passage, single means successively responsive to one of the results of such pitting operations to trip said latch and permit said spring to shift said blocking means for exposing the alternative path, and means for relatching said normally latched discharge path blocking means following each unlatching thereof.

6. In a fruit pitting machine, an endless conveyor having a plurality of fruit receptacles carried thereby, means for successively pitting fruit loaded in said receptacles, a pair of alternate discharge paths, one for properly pitted fruit and one for improperly pitted fruit, means for normally blocking one of said paths, said means being normally latched in such blocking position against a spring tending to shift said means to open the blocked passage and block the normally open passage, and single means successively responsive to one of the results of such pitting operations to trip said latch and permit said spring to shift said blocking means for exposing the alternative path to the passage of said successfully pitted fruit, said last means comprising an unstable element tending to move in a direction to cause tripping of said latch and restraining means for normally holding said element in its unstable position and releasing the same upon the occurrence of the pitting operation result to which the latch tripping means is responsive.

7. In a fruit pitting machine, a conveyor member having a plurality of spaced fruit receptacles mounted thereon, a pit receiving member having a plurality of pit receiving recesses therein, means for providing relative movement of said members to cause successive registration of said fruit receptacles with said recesses, pitting means operating on each fruit in turn as registry occurs to deposit a pit from said fruit into the recess registered with the receptacle holding the fruit being operated on, a pair of discharge paths for the fruit operated on by said pitting means, sorting means operable to direct fruit into either path, and single control means responsive to the presence or absence of a pit in successive recesses and connected to operate said sorting means.

8. Apparatus in accordance with claim 7 wherein said single control means is positioned to successively enter each recess unless prevented by a pit therein, the difference in position of said control means determining the direction of operation of said sorting means.

9. In a fruit pitting machine, a conveyor member having a plurality of fruit receptacles carried thereby, a pit receiving member separate from said conveyor, means for providing relative movement of said members to successively register the fruit receptacles with said pit receiving member, pitting means operating on each successive fruit when said registry has occurred to eject a pit therefrom into said pit receiving member, means for successively removing pits from said pit receiving member, means for sorting the fruit operated on by said pitting means into two groups and single means responsive to the successive presence or absence of a pit in said pit receiving member for controlling said sorting means.

10. In a fruit pitting machine, a conveyor member having a plurality of fruit receptacles carried thereby, a pit receiving member separate from said conveyor, means for providing relative movement of said members to successively register the fruit receptacles with said pit receiving member, pitting means operating on each successive fruit when said registry has occurred to eject a pit therefrom into said pit receiving member, means for successively removing pits from said pit receiving member, means for sorting the fruit operated on by said pitting means into two groups, control means positioned in accordance with the successive presence or absence of a pit in said pit receiving means, said sorting means being controlled by the position assumed by said control means.

11. In a fruit pitting machine, pitting means adapted to enter one side of a fruit to eject the pit therefrom on the opposite side, an endless conveyor for presenting a succession of individual fruit to the action of said pitting means, pit holding means separate from said conveyor positioned to receive pits after ejection from said fruit by action of said pitting means, means for removing pits from said pit holding means in synchronism with the action of said pitting means, sorting means for the fruit acted on by said pitting means, and a single control mechanism responsive to the successive presence or absence of a pit in said pit holding means for controlling said sorting mechanism.

12. In a fruit pitting machine, pitting means, an endless conveyor for presenting a succession of individual fruit to the action of said pitting means, pit holding means separate from said conveyor receiving each pit after ejection by said pitting means, means for removing pits from said pit holding means in synchronism with the action of said pitting means, sorting means for the fruit acted on by said pitting means, and a single control mechanism responsive to the successive presence or absence of a pit in said pit holding means for controlling said sorting means.

13. In a fruit pitting machine, a fruit conveyor having a plurality of spaced fruit receptacles thereon, a pit ejection member on one side of said conveyor, a pit receiving member separate from said conveyor on the other side of said conveyor, means for moving said fruit conveyor to successively position fruit in said receptacles between said members, means for reciprocating said pit ejection member through said fruit to normally eject the pit therefrom and deposit the ejected pit in said pit receiving member leaving said fruit in said receptacle, means for removing pits from said pit receiving member after deposit therein, single means successively responding to the presence or absence of a pit in said pit receiving member between the time of deposit in and removal therefrom, and fruit sorting means operating in accordance with the response of said single means to separate pitted from unpitted fruit.

14. In a fruit pitting machine, a fruit conveyor, a separate pit conveyor on one side of said fruit conveyor, a pitting knife on the other side of said fruit conveyor, means for reciprocating said knife, means for moving said fruit conveyor to bring fruit on said fruit conveyor successively into and out of alinement with the path of said pitting knife, to normally cause ejection of the pit from said alined fruit and from said fruit conveyor onto said pit conveyor, a pair of alternate discharge paths for fruit leaving said fruit conveyor, and sorting means operated in accordance with the successive presence or absence of pits on said pit conveyor for exposing one or the other of said discharge paths to the fruit operated on by said pitting knife.

15. In a fruit pitting machine, a conveyor member having a plurality of fruit receptacles carried thereby, a pit receiving member separate from said conveyor member, means for providing relative movement of said members to successively register the fruit receptacles with said pit receiving member, pitting means operating on each successive fruit when said registry has occurred to eject a pit therefrom into said pit receiving member, means for successively removing pits from said pit receiving member, means for sorting the fruit operated on by said pitting means into two groups and means for removing pits from said pit conveyor.

16. In a fruit pitting machine, a conveyor member having a plurality of fruit receptacles carried thereby, a pit receiving member separate from said conveyor member, means for providing relative movement of said members to successively register the fruit receptacles with said pit receiving member, pitting means operating on each successive fruit when said registry has occurred to eject a pit therefrom into said pit receiving member, means for successively removing pits from said pit receiving member, means for sorting the fruit operated on by said pitting means into two groups and means for removing pits from said pit receiving member after said sorting means has operated.

17. Apparatus in accordance with claim 7 wherein the sorting means is operated while the next fruit is being conveyed to a position between said pit receiving member and said pitting means.

18. In a fruit pitting machine, means for moving a succession of unpitted fruit through a pitting station, means for moving a pitting plunger through each fruit on arrival at that station to eject the pit therefrom, a pit receiving member positioned in the pit path and separated from said fruit moving means, means for withdrawing said plunger leaving each ejected pit in said pit receving means, means for successively removing pits from said pit receiving member, means for successively sorting fruit operated on by said pitting plunger, and single means responsive to the successive presence or absence of a pit in said pit receiving member.

19. Fruit pitting machine comprising a rotating hollow member having spaced openings therein, a conveyor encircling said member and having individual resilient perforated bottom fruit carrying devices capable of registering with said member in alinement with said openings during the passage of said fruit carrying devices around said member, pitting means mounted above said member and adapted during pitting strokes to eject into said openings in said member the pits from fruit carried thereto by said fruit carrying devices; a pair of alternate discharge routes for said fruit, and means controlled by the presence or absence of a pit in said openings for exposing one or the other of said discharge routes to such fruit as it is discharged from said machine.

20. Fruit pitting machine comprising a rotating hollow member having spaced openings therein, a conveyor encircling said member and having individual resilient perforated bottom fruit carrying devices capable of registering with said member in alinement with said openings during the passage of said fruit carrying devices around said member, pitting means mounted above said member and adapted during pitting strokes to eject into said openings in said member the pits from fruit carried thereto by said fruit carrying devices; a pair of alternate discharge routes for said fruit, means resiliently bearing against the inner surface of said member in line with the path of said openings and precluded from fully entering any such openings by the presence of a pit therein, a pair of discharge routes for said fruit, and means including said resilient means for exposing one or the other of said discharge routes to the output of said machine in accordance with the presence or absence of a pit in said openings.

21. In a fruit pitting machine, a fruit conveyor, a separate pit receiving member on one side of said fruit conveyor, a pitting knife on the other side of said fruit conveyor, means for reciprocating said knife, means for moving said fruit conveyor to bring fruit on said fruit conveyor successively into and out of alinement with the path of said pitting knife, to normally cause ejection of the pit from said alined fruit and from said fruit conveyor into said pit receiving member, a pair of alternate discharge paths for fruit leaving said fruit conveyor, and sorting means operated in accordance with the successive presence or absence of pits in said pit receiving member for exposing one or the other of said discharge paths to the fruit operated on by said pitting knife.

ELLSWORTH W. CARROLL.